United States Patent
Dussud (12) United States Patent (10) Patent No.: US 6,502,111 B1
(45) Date of Patent: Dec. 31, 2002

(54) METHOD AND SYSTEM FOR CONCURRENT GARBAGE COLLECTION

(75) Inventor: Patrick H. Dussud, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 09/629,031

(22) Filed: Jul. 31, 2000

(51) Int. Cl.⁷ .............................................. G06F 17/30
(52) U.S. Cl. ..................................................... 707/206
(58) Field of Search ............................ 707/206; 709/1, 709/107, 315; 714/9; 717/162

(56) References Cited

U.S. PATENT DOCUMENTS

| | | | |
|---|---|---|---|
| 5,842,016 A | | 11/1998 | Toutonghi et al. ........... 707/206 |
| 5,857,210 A | * | 1/1999 | Tremblay et al. ............ 707/206 |
| 5,873,104 A | * | 2/1999 | Tremblay et al. ............ 707/206 |
| 5,873,105 A | * | 2/1999 | Tremblay et al. ............ 707/206 |
| 6,055,612 A | | 4/2000 | Spertus et al. ............... 711/165 |
| 6,065,020 A | | 5/2000 | Dussud ....................... 707/206 |

OTHER PUBLICATIONS

'Garbage Collection in MultiScheme (Preliminary Version)', J.S. Miller and B. Epstein in "Parallel Lisp: Languages and Systems", Springer–Verlag Lecture Notes in Computer Science, T. Ito and R.H. Halstead, Jr., editors, 1990.

Richard Jones and Rafael Lins, *Garbage Collection: Algorithms for Automatic Dynamic Memory Management*, 1996, pp. 184–226.

Anthony James Courtemanche, *MultiTrash, a Parallel Garbage Collector for MultiScheme*, Jan 21, 1986, pp. 1–47.

* cited by examiner

*Primary Examiner*—Diane D. Mizrahi
(74) *Attorney, Agent, or Firm*—Merchant & Gould P.C.

(57) ABSTRACT

A method and system for concurrent garbage collection wherein live memory objects, i.e., not garbage, can be marked while an application executes. Root information is gleaned by taking a snapshot program roots or by arranging the stack to be scanned during execution of the program. Next, a first marking act is performed using the root information while the program executes. Modifications in the memory structure that occur during the concurrent marking act are logged or accumulated by a write watch module. The application is then paused or stopped to perform a second marking act using information from the write watch module. Following the second marking act, the garbage collection may be completed using various techniques.

31 Claims, 5 Drawing Sheets

METHOD AND SYSTEM FOR CONCURRENT GARBAGE COLLECTION

CROSS REFERENCE TO RELATED APPLICATIONS

The present application is related to copending and pending U.S. patent application Ser. No. 09/628,708, titled EFFICIENT WRITE-WATCH MECHANISM USEFUL FOR GARBAGE COLLECTION IN A COMPUTER SYSTEM, which is filed Jul. 31, 2000 concurrently herewith, and is incorporated herein by this reference for all that it discloses and teaches, and is assigned to the assignee of the present application.

TECHNICAL FIELD

The present invention relates to methods and systems for the automatic reclamation of allocated memory, normally referred to as "garbage collection." More particularly, the present invention relates to garbage collection that utilizes a technique known as "marking" of memory portions or objects.

BACKGROUND OF THE INVENTION

During execution of a computer program or application, memory is allocated to the program to enable various operations. Once allocated, other executing processes cannot use the memory allocated to the program, i.e., memory use is exclusive. When the program has finished using a portion or object of allocated memory, it may explicitly deallocate or release that memory. For example, the program may "dispose," "kill," or "free" the memory via a specific programming code function. Once freed, other applications or processes can then use the memory.

Often however, and for various reasons, the program to which the memory was initially allocated does not release objects of the memory, even after the program is finished using that memory. Moreover, when a program is done using a memory block or object, references to that object no longer exist. Without such a reference, that memory object cannot be reached by the application. Consequently, once the program has finished using the memory, that memory cannot be reused until it is freed by the program or reclaimed by another memory management program and then reallocated to either the initial application or process or to another application or process. Thus, allocated yet unreachable objects are unusable, and are considered to be "dead" or "garbage."

Typically, the processes of allocating memory objects to applications and reclaiming dead memory objects, i.e., garbage collection, are performed by a memory manager. The memory manager tracks which memory objects are currently allocated to the computer program and which objects are currently available to be allocated through a "free list" that keeps track of available objects. Thus, memory objects that are not on the free list are currently allocated to a computer program or application. Other memory managers do not use a free list, and instead allocate memory using an increasing memory address scheme. It is important to not only reclaim dead memory objects, but also compact the live objects to prevent memory fragmentation.

Consequently, the memory manager determines, based on predetermined thresholds, when to perform garbage collection. A common predetermined threshold is based on the number of allocated objects or objects of memory. That is, the memory manager maintains a running total of the number of allocated objects and once the number of objects exceeds a predetermined threshold number, the memory manager initiates garbage collection. Following the garbage collection, the running total of allocated objects is reduced by the number of reclaimed objects of memory or reset to zero, depending on the particular algorithm used. Once the running total exceeds the predetermined threshold again, the memory manager simply reinitiates the garbage collection process.

There are several common techniques for garbage collection. One technique for garbage collection relates to logically dividing the memory in half and using only one half of the memory at a time. During garbage collection, the memory manager copies the reachable objects to the other half of memory. Following the copying of all marked objects, the memory manager frees the entire first half of memory. Consequently, the previously used memory, which contained both the reachable objects and the garbage objects, becomes free memory and therefore contains only objects that are available to be allocated.

Another common garbage collection technique relates to the mark-and-sweep method, which marks all reachable objects of memory and then sweeps the entire heap to reclaim all unmarked objects of memory by adding the unmarked objects to the free list. When the sweep phase is complete, all garbage objects are now on the free list and available to be reallocated to the computer program.

In some situations, the mark-and-sweep may be preferred over the copying system because it is faster than copying garbage collection since the copying of objects and the updating references simply takes more time than adding a garbage block to a free list. Moreover, the mark-and-sweep technique is often more efficient since it uses the whole memory, as opposed to only half, as used in the copying technique. However, in other situations, the copying technique may be preferred due to the lack of fragmentation. In yet another technique, the mark and sweep technique is improved by adding a defragmentation or compaction step at the end of the sweep or reclamation process.

Each of these techniques, however, suffers a particular drawback based on the time it takes to mark each reachable block. During this marking phase, the system must stop or pause the executing applications processes, and such pauses significantly decrease the performance of the applications. That is, since any executing processes may modify the allocation of memory objects, the memory manager might miss reachable objects if the garbage collection process is running concurrently with other processes. Therefore, the application and other process are stopped for a considerable amount of time while the system checks all the allocated objects, and marks those objects as live.

The actual time it takes to mark the allocated objects varies and is dependent on the number of objects that are reachable. Since many applications may be running at one time and since many applications use a substantial amount of memory, typically the number of memory blocks or objects that are reachable is quite extensive. Consequently, the marking phase consumes a significant amount of time. Unfortunately, during this time period, the applications remain halted, preventing any further processing or interaction with the user.

One solution to this problem has been to perform the marking process as a separate thread running concurrently with the execution of programs and processes while implementing what is known as a "write barrier." Using write barriers involved an additional process step performed by any running application or process that modified a memory object of marking each object as modified. In essence, the application was required to mark each object changed by the application as the modification occurred. Thus the garbage collector, during its marking phase, could go back and determine which objects to revisit based on the fact that any modified objects were marked as such by the application. Unfortunately, the additional marking steps performed by the application significantly decreased the performance of the program.

It is with respect to these considerations and others that the present invention has been made.

SUMMARY OF THE INVENTION

The present invention relates to a system and method of garbage collection that marks reachable objects concurrently with the processing of an application and operates in combination with a write-watch system that accumulates or logs which memory objects are modified during the marking phase. Using the accumulated modifications, the present invention revisits and marks modified objects while pausing the application for only a brief amount of time. The brief time that the application is stopped or paused is less than the amount of time it would have been paused, had the application been paused for the entire marking phase, yet the execution performance of the application does not suffer since it is not responsible for marking modified objects.

In accordance with certain aspects, the present invention relates to a system and method of marking memory objects for collecting garbage in a computer system by getting program root information, wherein the program root information has object references to memory objects. Next, the invention accumulates modification information using a write watch module wherein the modification information relates to memory objects that were modified following the getting of program root information. Meanwhile, the system and method marks reachable memory objects using the program root information. Following the marking operation, the system and method revisits modified memory objects identified by the accumulated modification information and marks the revisited memory object.

In accordance with other aspects, the system and method repeats the act of revisiting modified memory objects using updated information from the write watch module a predetermined number of times. In another embodiment the information received from the write watch module is tested against a predetermined threshold to determine whether the revisiting process is repeated. The predetermined threshold may be related to the number of allocated objects or, more specifically, a percentage based on the total number of allocated objects of memory.

In accordance with yet other aspects, the system and method uses a tricolor marking system where unvisited memory objects are indicated using a first color, such as white, visited objects are indicated using a second color, such as black, and visited but modified objects are indicated using a third color, such as gray. The modified visited objects are objects that have been modified after being visited a first time. In other embodiments, other marking schemes are used.

In an embodiment, the system and method of the present invention relates to collecting garbage for an executing application by first pausing the executing application. Once paused, a snapshot of a root stack is taken, i.e., by copying object references from relevant stacks to a temporary storage or by setting up markers on the stacks so the stacks can be scanned while active. Next, a write watch module to keep track of modifications in the memory is initiated and then the application is restarted. While the application is running, a first marking act of marking all reachable memory objects using snapshot information is performed. The application is paused after the marking act is complete. Next, a second marking act of marking all reachable memory objects is performed wherein the reachable objects marked by the second marking are identified by the write watch module. Following the second marking act, all unmarked garbage objects are collected and then the application is restarted.

The collecting act, in an embodiment relates to sweeping the memory and adding references to the unmarked memory to a free list. In another embodiment, the collecting act relates to copying all marked objects to a different memory portion. In yet another embodiment the collection act relates to planning the relocation of the marked memory objects, updating object references located within other memory objects, compacting the memory objects to relocate the memory objects, and updating a reference pointer related to an end of the compacted memory.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

In general, the present invention is embodied in a system and method for reclaiming unused memory portions, blocks, pages or objects (collectively referred to herein as "objects") that are allocated to application programs or other processes, i.e., garbage collection. An embodiment of the invention involves stopping/pausing any executing applications or processes, taking a snapshot of the existing object references on various stacks or setting up markers so the various stacks can be scanned while the program is running, and then restarting the applications or processes. A memory management module known as "write-watch" tracks any modifications to the memory allocations while the garbage collector then marks all reachable memory objects using the information from the snapshot. The reachable memory objects are those objects that are not considered garbage. Once all reachable objects are marked, the applications/processes are paused a second time and the garbage collector marks all remaining reachable objects using information gleaned from the write watch module. Following the marking of all reachable objects, the garbage collector performs all remaining operations to effectively reclaim all allocated, but unused, memory objects.

Figure 1:
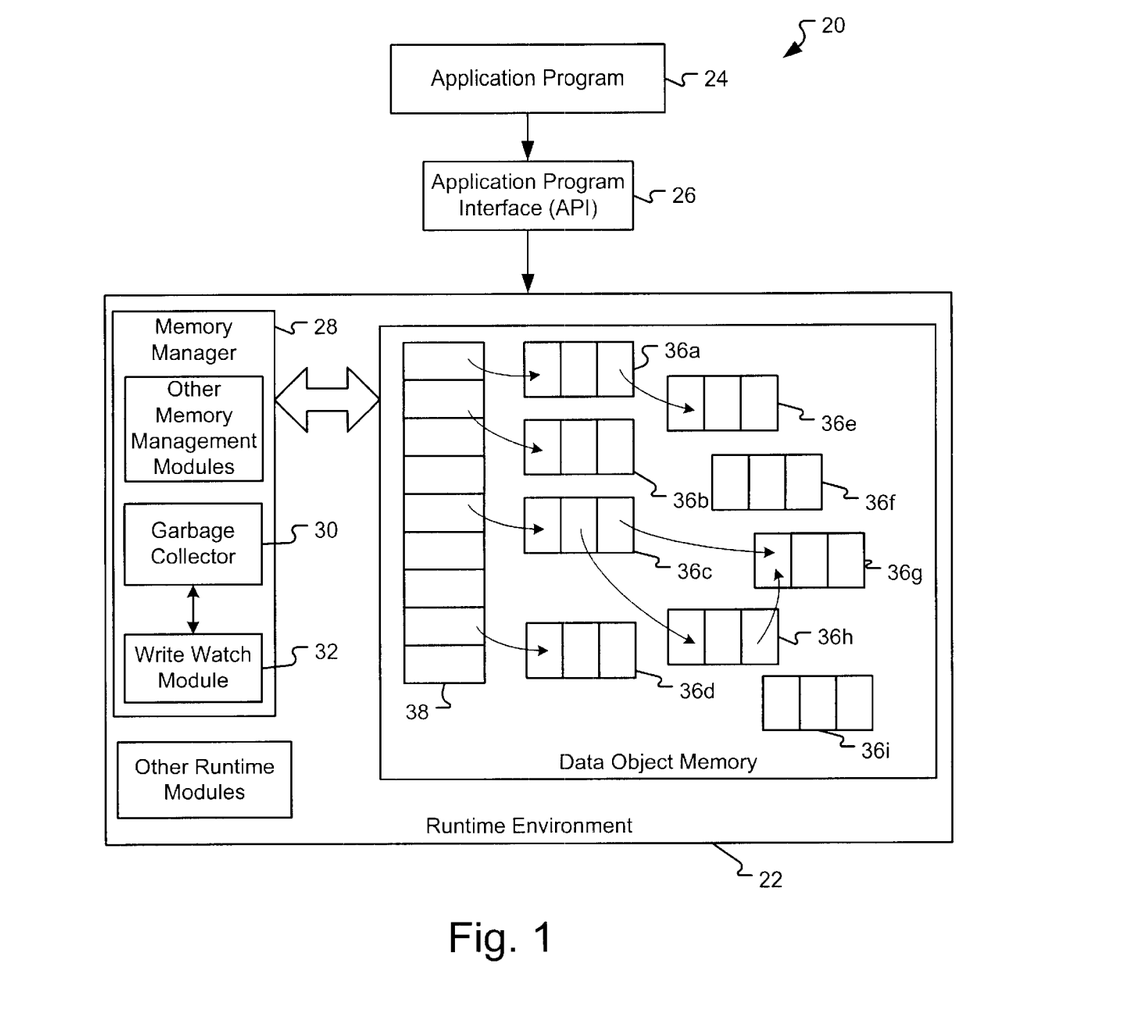
FIG. 1 illustrates the functional components of a software environment incorporating a garbage collector of the present invention.

The functional software components of a system 20 that incorporates aspects of the present invention are shown in FIG. 1. The system 20 has a runtime environment 22 which operates to execute application programs and processes, such as application program 24. The application program 24 may directly communicate with the runtime environment or communicate through an application program interface, such as application program interface 26 shown in FIG. 1.

The runtime environment 22 incorporates a memory manager 28 having a garbage collector module 30. In alternative embodiments, the garbage collector may not be in the memory manager, and may even be a separate application program apart from the runtime environment. The garbage collector 30 operates in combination with a write watch module 32 to perform garbage collection for the system 28. In one embodiment, the write watch module is part of the runtime environment, as shown in FIG. 1. Alternatively, the write watch module may be part of the memory manager 28 or may be a separate application that communicates with the runtime environment 22. Since the write watch module accumulates and maintains the list of memory objects, the application or program threads are not required to perform the additional process steps of marking each memory object as modifications occur.

The write watch module 32 maintains an array of memory locations that indicate which memory locations objects have been written to since the last time the garbage collector 30 has been called. The garbage collector 30 may initialize the write watch module 32 by providing a range of memory addresses to indicate which memory locations should be watched so that the write watch module can clear any previous information for those locations and begin watching the same. When desired, the garbage collector 30 requests the information accumulated by the write watch module 32. Additionally, the write watch module 32 is cleared once the module 32 provides the garbage collector 30 any information, so that the next time the garbage collector requests information, only relevant information is provided. More details of a write watch module may be found in copending and pending U.S. patent application Ser. No. 09/628,708, titled EFFICIENT WRITE-WATCH MECHANISM USEFUL FOR GARBAGE COLLECTION IN A COMPUTER SYSTEM, which, as stated above, is filed Jul. 31, 2000 concurrently herewith, and is incorporated herein by this reference for all that it discloses and teaches, and is assigned to the assignee of the present application.

The runtime environment 22 also incorporates an object memory portion 34, which is the portion of memory that maintains allocated memory objects such as memory objects 36 for the application program 24. The connection of the various memory objects 36 is often referred to as a "graph." In addition to the memory object 36, the memory portion 34 also maintains a stack 38 of root references, which are storage locations that are always deemed to be live, i.e., not garbage. The stack 38 of root references typically contains object reference information that references memory objects 36a, 36b, 36c and 36d where object reference information is essentially a variable that contains the memory location (address) of some data rather than the data itself.

The memory objects, in turn, may have object reference information that references other memory objects. For example, in FIG. 1, memory object 36a references 36e, memory object 36c references both memory objects 36g and 36h. Alternatively, the memory objects may not have information referencing other memory objects, such as memory object 36d, does not reference any other memory object. Additionally, some memory objects may exist that are referenced by either a root reference or another memory object, such as memory object 36f, which is not referenced by any other object.

The memory objects, such as memory objects 36a, 36b, 36c, 36d, 36e, 36g and 36h are all referenced by another memory object or root, and are therefore considered to be live and reachable. On the other hand, memory objects 36f and 36i are not referenced by another memory object or root and therefore considered to be garbage, i.e., space no longer required by the computation but that has not yet been reclaimed by the garbage collector. The garbage collector, during the mark phase, marks all the live objects, such as 36a, 36b, 36c, 36d, 36e, 36g and 36h and then, during the collecting phase, reclaims any objects that are not marked, such as 36f and 36i.

In an alternative embodiment, the garbage collector operates only on portions of the memory at a time. In such a case, the memory may be divided into segments, where a given portion of the most recently allocated memory objects makes up an "ephemeral" portion. The garbage collector may operate solely on the ephemeral portion or it may operate on the different portions at different times. When the collector operates on a predetermined portion of the memory, a range of memory addresses is supplied to the write watch module to enable the write watch module to keep track of the proper memory objects.

Figure 2:
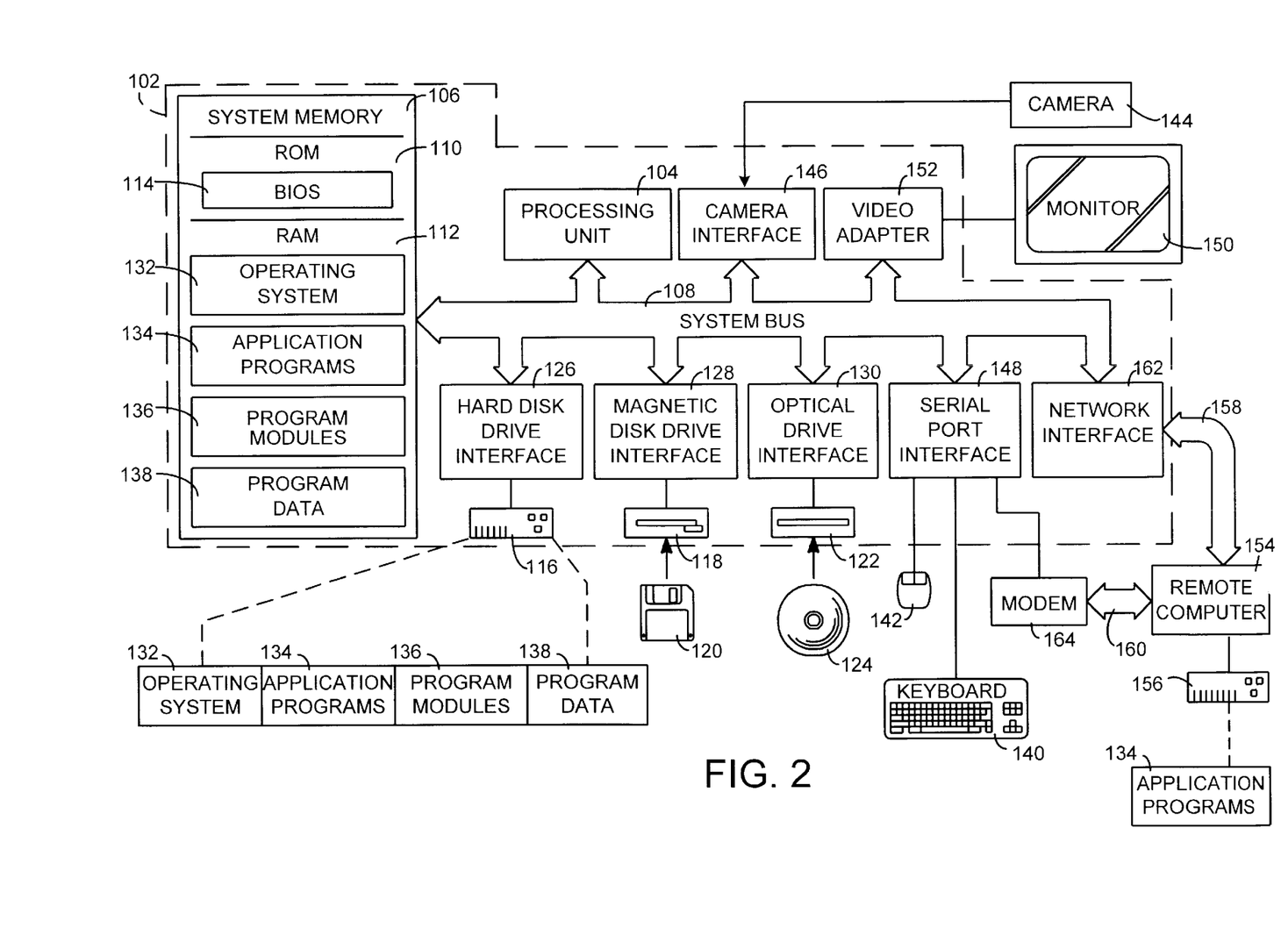
FIG. 2 is block diagram of a computer representative of the type of computer that may be used during the execution of an embodiment of the present invention.

FIG. 2 and the following discussion are intended to provide a brief, general description of a suitable computing environment in which the invention may be implemented. Although not required, the invention is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system 100 for implementing the invention includes a general purpose computing device in the form of a conventional personal computer 102, including a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. The system memory 106 includes read only memory (ROM) 110 and random access memory (RAM) 112. A basic input/output system 114 (BIOS), containing the basic routine that helps to transfer information between elements within the personal computer 102, such as during start-up, is stored in ROM 110.

The personal computer 102 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 102 through input devices such as a keyboard 140 and pointing device 142 (such as a mouse). A camera 144 capable of capturing a sequence of images can also be included as an input device to the personal computer 102 through an appropriate camera interface 146, which is connected to the system bus 108. Other input devices (not shown) may include a microphone, joystick, game pad, satellite dish, scanner, or the like. These and other input devices are often connected to the processing unit 104 through a serial port interface 148 that is coupled to the system bus 108, but may be connected by other interfaces, such as a parallel port, game port or a universal serial bus (USB). A monitor 150 or other type of display device is also connected to the system bus 108 via an interface, such as a video adapter 152. In addition to the monitor, personal computers typically include other peripheral output devices (not shown), such as speakers and printers.

The personal computer 102 may operate in a networked environment using logical connections to one or more remote computers, such as a remote computer 154. The remote computer 154 may be another personal computer, a server, a router, a network PC, a peer device or other common network node, and typically includes many or all of the elements described above relative to the personal computer 102, although only a memory storage device 156 has been illustrated in FIG. 3. The logical connections depicted in FIG. 3 include a local area network (LAN) 158 and a wide area network (WAN) 160. Such networking environments are commonplace in offices, enterprise-wide computer networks, Intranets and the Internet.

When used in a LAN networking environment, the personal computer 102 is connected to the local network 158 through a network interface or adapter 162. When used in a WAN networking environment, the personal computer 102 typically includes a modem 164 or other means for establishing communications over the wide area network 160, such as the Internet. The modem 164, which may be internal or external, is connected to the system bus 108 via the serial port interface 148. In a networked environment, program modules depicted relative to the personal computer 102, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the operative modules embodying the invention. The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

With respect to the garbage collector module 30, shown in FIG. 1, it performs a number of operations in order to reclaim the memory. As stated above, the first step is to mark all live objects as in use. Following the mark phase, a sweep phase achieves the actual collection of garbage and thus reclaims the dead memory for use by other application programs or processes. Alternatively, following the mark phase the garbage collector 30 may perform a planning phase, a relocation phase and a compaction phase. In yet another embodiment, the collector 30 may perform a copying phase after the marking phase. Yet, each embodiment performs the marking phase of the present invention.

Figure 3:
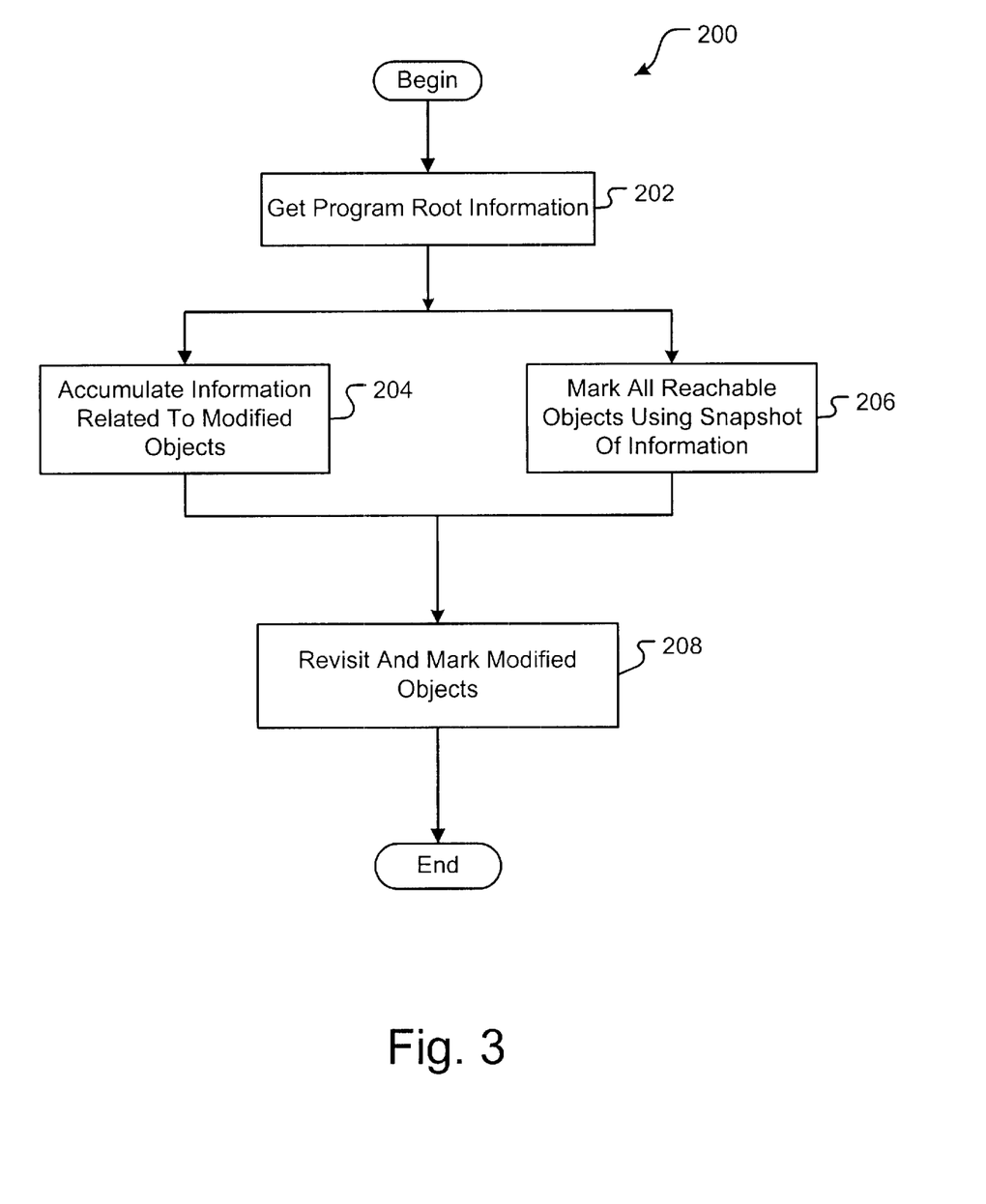
FIG. 3 is a flow diagram showing the operational characteristics performed by the garbage collector shown in FIG. 1 to mark live objects in accordance with the present invention.

The procedural flow 200 of operations performed by the garbage collector 30 in order to mark all the live objects is shown in FIG. 3. In an embodiment, the memory manager 28 initiates the flow 200 once a predetermined number of memory objects have been allocated. In other embodiments, another module initiates the garbage collection flow 200, such as the garbage collector 30 or the runtime environment 22, among others.

The flow 200 begins with get program root information operation 202, which gets or locates the program root objects in the relevant stack or stacks, since each live object can be traced back to a root. In essence, get operation 202 either stores information about the roots or makes root information available which further allows a traversal of all live or, readable memory objects. One technique of getting the root information involves cloning the stack, i.e., taking a snapshot and storing the information for later use. Another technique arranges for the scanning of the stack or stacks while the program is running.

Once get operation 202 gets the root information, accumulate operation 204 begins accumulating information relating to any changes or modifications made to memory objects. In an embodiment of the invention, the accumulate operation is performed by a write watch module, such as write watch module 32 shown in FIG. 1. The accumulate operation 204 may utilize a separate data structure to store an array of address values coupled with a "modified" flag or bit map having at least one bit for each object in the range of memory subject to the garbage collection. When the application modifies a memory object the bit or flag is set to indicate such a modification. The accumulate process may be performed after the modification has occurred, and no exception handling is required to perform the function.

Mark operation 206 also begins following the get program root operation 202. Mark operation 206 marks memory objects that are reachable through the root information made available through get operation 202. Mark operation 206 executes as a separate thread and may therefore run concurrently with any other applications or processes. Although mark operation 206 may run concurrently with other applications, the marking process 206 may begin and execute independently of any other processes. Similarly, accumulate operation 204, discussed above, may operate independently of the marking operation 206.

In an embodiment of the invention, the mark operation 206 marks objects based on a snapshot of information. In this embodiment, since an application may be running concurrently with the mark operation 206, the objects that are marked may or may not be live. That is, mark operation 206 may mark live objects as desired and may mark objects that were live when the snapshot occurred but later became garbage. Such "false positives" remain marked as live until the next garbage collection session.

In essence, the accumulate operation 204 is performed by a module that monitors the memory in such a manner that when an application thread modifies a memory object, the accumulating module, such as write watch, is aware of the modification and keeps track of the modification. Accumulating modification information, i.e., information indicating which memory objects were modified during mark operation 206, is performed independently of the mark operation 206 and relatively independently of the application thread modifying the memory object.

Following mark operation 206, revisit/mark operation 208 revisits and marks all modified objects based on information accumulated by accumulate operation 204. The information from accumulate operation 204 provides the garbage collector the ability to revisit, analyze and mark these memory objects so that any changed in the memory graph are not lost. In an embodiment of the invention, the application may be stopped prior to the revisit/mark operation 208 and thus, following operation 208, the marking phase 200 ends. In an alternative embodiment, the application is not stopped during revisit/mark operation 208. In such a case, additional steps may be added to accumulate subsequent changes, revisiting of the changed objects and the marking of any remaining live objects prior to ending process 200.

Figure 4:
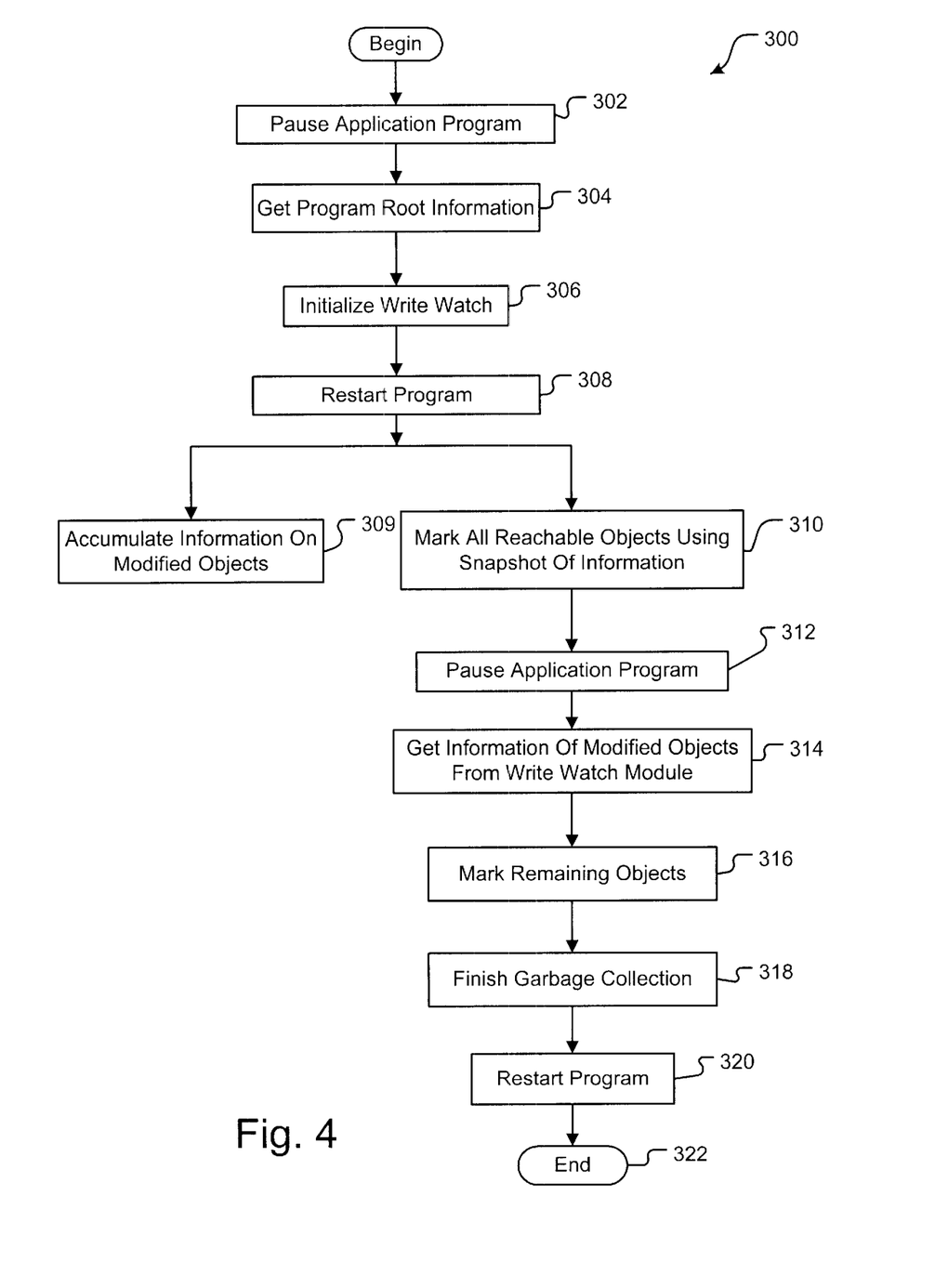
FIG. 4 is a flow diagram showing the operational characteristics performed by the garbage collector shown in FIG. 1 in collecting garbage objects in accordance with an embodiment of the present invention.

The procedural flow 300 of operations performed by the garbage collector 30 in an alternative embodiment of the invention during a collection session is shown in FIG. 4. The flow 300 shown in FIG. 4 incorporates the marking concepts described above in conjunction with FIG. 3.

The flow 300 begins with pause operation 302, which pauses any executing application program, such as application program 24 or any other running process that uses memory and must be stopped during the marking phase. Once the application is paused, get program root information operation 304 makes program root information available such as through a cloning operation or other technique, which is similar to operation 202 described above.

Once the root information is available, initialize operation 306 initializes the write watch module. Initializing the write watch module clears the listing of any modified memory objects that may be stored by the write watch module during modifications to the memory objects. The initialize operation 306 may actually start the write watch module 32 so that future modifications are properly recorded. In other embodiments, the write watch module 32 is constantly recording information about memory modification events and therefore does not need to be started, only cleared.

Once the write watch module has been cleared and initiated, restart operation 308 restarts the application program that was paused by pause operation 302. Similarly, any other application or process that may have been paused by operation 302 is also restarted by restart operation 308. At this point, the application program may proceed as designed, requesting memory allocations, modifying existing memory objects and/or creating new garbage memory objects.

While the application is running, accumulate operation 309 accumulates information related to any memory modification and logs such information for later use by the garbage collector, as discussed above with respect to operation 204 shown in FIG. 3. In an embodiment, the write watch module accumulates the information. Other embodiments may use other modules (not shown) to store the information accumulated by the write watch module.

During the execution of the program and while accumulate operation 309 is accumulating changes, operation 309 is accumulating changes, mark operation 310 begins marking all reachable objects using root information gleaned from get program root information 304. Mark operation may recursively traverse the memory objects, beginning at the first root reference and traverse each pointer representation, marking each item that is visited until all pointers for that root reference are exhausted. Once exhausted, the process proceeds to the next root reference, again traversing each pointer reference and marking each visited object as visited. The same process continues until all root references, and their associated, reachable memory objects are marked as reachable, i.e., live.

In alternative embodiments, recursion is replaced by other methods of tracing objects referenced by pointers, such as iterative loops and auxiliary data structures. Thus, an auxiliary stack can be used to store pointer information to live objects that have not been visited. As each item is popped from the stack the related memory object is marked as visited. Moreover, as each item is popped from the stack, the memory object related to the item is analyzed to determine whether that referenced object points to one or more other objects. If so, information related to the pointed-to object is placed on the stack indicating that the object is live. While on the stack, the object is deemed unvisited and is later analyzed in a manner similar to the other stack items. This process continues until the stack is empty.

With respect to marking, there are many acceptable methods of marking memory objects. That is, for the purposes of the present invention, any marking scheme that effectively identifies the live objects as live may be used. For example, a single bit can be changed to indicate marked or unmarked. As an alternative example, the memory objects may be marked using the more traditional three-color marking scheme wherein unmarked objects are white, marked objects are black and marked but later modified objects are gray. In yet another alternative embodiment, references to the live objects could be stored in a data structure and later used during the clean up or sweep portion of the garbage collection.

Following the marking operation 310, pause operation 312 temporarily pauses the program for a second time. This step is similar to the pause operation 302 described above in that it temporarily pauses the application(s) or other running processes.

Once paused, get operation 314 gets information from the write watch module related to any changes made with respect to the status of any memory objects. Thus, if any new memory allocations were made, then the write watch module can provide that information to the garbage collector. Additionally, if any existing, marked objects are modified, then that information is also provided to the garbage collector at get operation 314. The get operation 314 also resets the write watch module. Resetting the write watch module insures that if and when the program is started again, any changes that are made are logged appropriately, and that there is no confusion with which changes were made prior to the get operation 314 and after the get operation 314.

Based on the information received from the write watch module, and while the application is stopped, the objects that were modified are visited and marked. The marking process is similar to mark step 310 in that an object is visited and then tested for any other reference pointers to other objects. If other objects are pointed to, then those are objects are visited, marked, and tested for other reference pointers. The flow continues until all changed objects are visited and marked. This act effectively handles changes in the memory configuration as reported by write watch.

Once the modified or dirty objects are revisited, the process then examines the existing stack, and marks any remaining objects based on the analysis of the stack. Because the program was running for some time prior to this sty, the root information may have changed since the get operation 302. Thus, the stack is reexamined with its changes and the process can mark any objects that were not previously marked. In operation, a significant amount of the stack has been marked and therefore this process step does not consume much time.

Once all objects are marked, then finish module 318 effectively carries out the actual sweeping and/or copying of objects to reclaim all unmarked memory objects. In an embodiment of the invention, the clean up phase is similar to the sweep phase of the traditional mark and sweep algorithm. That is, the garbage collector sweeps the memory space to determine which objects are allocated but are not marked. The unmarked memory objects are then reclaimed, i.e., added to the free list. In alternative embodiments, the clean up phase may involve the copying of all marked memory objects to another portion of the memory space, such as in the traditional copying algorithm.

In another embodiment of the invention the garbage collector 30 further performs a relocation/compaction act. In order to achieve relocation/compaction, the garbage collector 30 first performs a planning step immediately following the marking phase. The planning phase analyzes the physical locations and positions of the live memory objects as compared to gaps between live objects. The planning stage can compute new locations for the live memory objects to reduce fragmentation. At this step, a tuning process can determine whether it is worthwhile to recopy a large chunk of data to gain a very small portion of memory. Thus, certain thresholds can be utilized to prevent a relocation step, which may hurt performance, in which it takes more time to move the data than will be gained in having the extra free memory.

Assuming relocation is appropriate, a relocation act is performed following the planning phase in order to modify any object references in memory objects that refer to objects that are to be moved. Following relocation a compaction act moves the data in the memory objects to fill the gaps. This act compacts the memory and also de-fragments the memory by filling gaps between memory locations. The relocation/compaction phases may be handled concurrently with the execution of the application, or, in alternative embodiments, may occur while the application and other processes are stopped.

Once the garbage collection is finished at operation 318, restart operation 320 then restarts the program. Following restart operation 320, the flow of operation 300 is completed.

Figure 5:
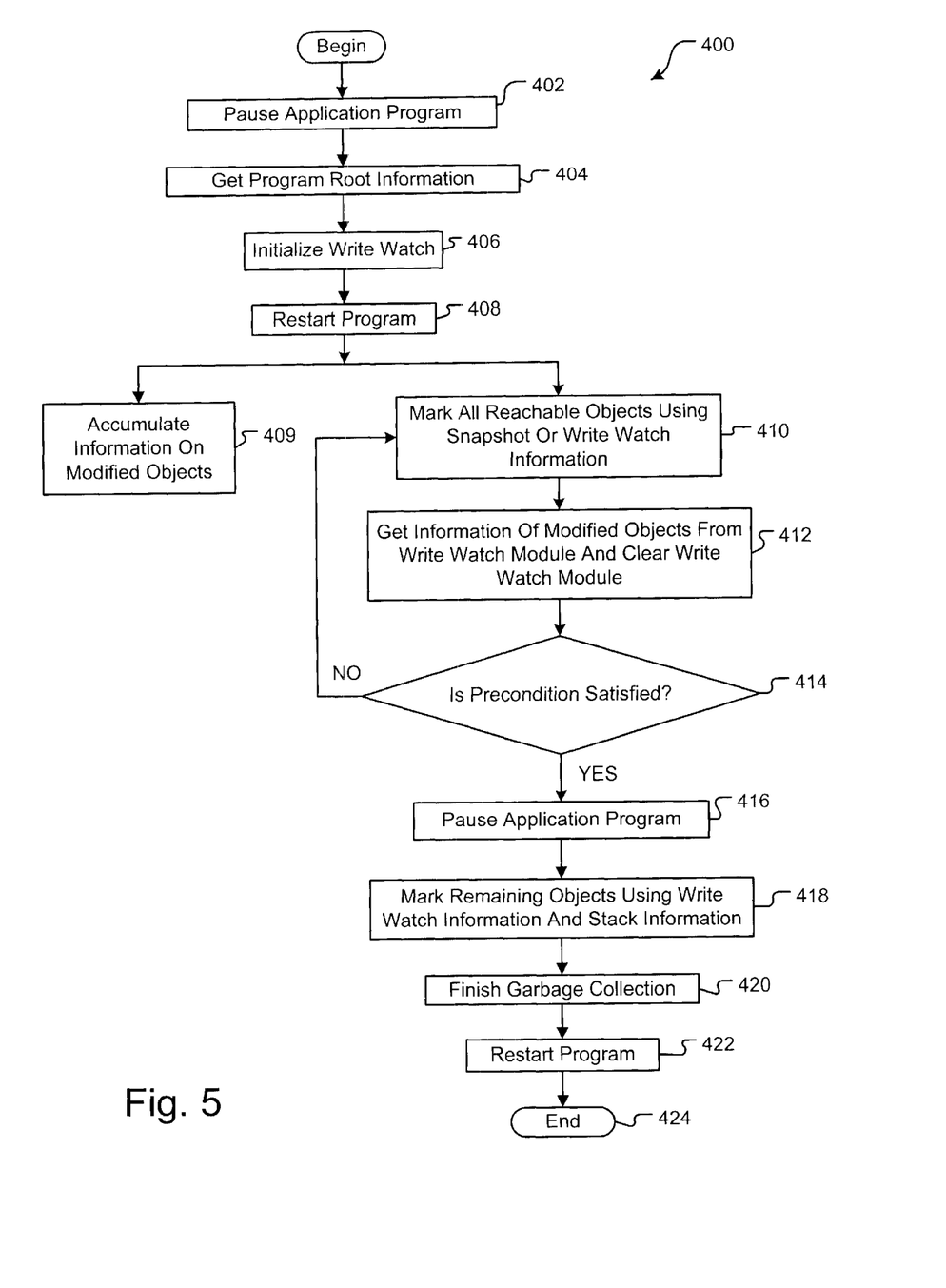
FIG. 5 is a flow diagram showing the operational characteristics performed by an alternative embodiment of the garbage collector shown in FIG. 1 in accordance with the present invention.

An alternative flow 400 of operations is shown in FIG. 5. In general, the first four operations, pause operation 402, get program root information operation 404, initialize write watch 406 and restart program 408 are similar to operations 302, 304, 306 and 308, respectively, as discussed above in conjunction with FIG. 4. Initially, the executing program is paused momentarily at operation 402 (as in operation 302) while get operation 404 takes a snapshot of the memory layout or otherwise arranges for scanning of the stack during program execution, which is similar to operation 304 discussed above. Following the get operation 404, write watch module is initialized at operation 406, which is similar to operation 306 and then the program is restarted at operation 408, which is similar restart operation 308 as discussed above in conjunction with FIG. 4.

Once the program is restarted at 408, accumulate operation 409 accumulates information related to memory modifications. Accumulate operation 409 is similar to get 309 discussed above in conjunction with FIG. 4.

During execution of the program and while accumulate operation 409 accumulates modifications, mark operation 410 traces and marks the reachable objects using the snapshot information. Mark operation 410 operates as a separate thread and may therefore operate concurrently with the execution of the program restarted by restart operation 408. Mark operation 410 marks memory objects using either the snapshot of root information or by scanning the stack in the same manner as mark operation 310 described above in conjunction with FIG. 4.

Once the reachable objects are marked, get operation 412 gets any information recorded by the write watch module during the execution of the program. In contrast to the get operation 314 discussed above which retrieved information from the write watch module while the program had been paused by pause operation 312, get operation 412 gets information from the write watch module without stopping or pausing the application or program. In order to do so, the write watch module is cleared after the information is retrieved and before any other modifications to any memory objects are performed. As long as the write watch module is cleared before any new modifications occur, then the next set of information provided by the write watch module does not miss object modifications. One method of insuring that the write watch is cleared prior to any modifications is to make sure that the reset operation is performed immediately after retrieving the information, i.e., reset is the next operation performed by the CPU.

Upon receiving the information from the write watch module, test operation 414 tests whether a precondition has been satisfied. If the precondition has not been satisfied then flow branches NO back to mark operation 410 and another round of marking should be completed before pausing the application at operation 416. Test operation enables the process to be tuned so that if there happens to be a significant number of modifications, then the process can use the information gleaned from the write watch module and revisit those modified objects prior to completing the garbage collection process 400. Mark operation 410 uses the information received from the write watch module during the get operation 412 and revisits the modified objects, marking the modified objects as visited.

In an embodiment, test operation compares the number of modified memory objects to a predetermined threshold value, i.e., the precondition is whether the number modifications is less than a threshold number. If the number of modifications is less than the threshold number, then flow branches YES to pause operation 416. Otherwise, if the number of modifications is greater than the threshold value, then flow branches NO back to mark operation 410. In another embodiment, the precondition relates to whether the number of modifications is less than a predetermined threshold percentage value based on the number of live objects. For example, if the number of modifications is less than one percent (or some other percentage) of the allocated objects, then flow branches YES to pause operation 416 and if the number of modifications is greater than or equal to one percent then flow branches NO to mark operation 410. These threshold numbers may or may not be modifiable by a user of the system.

In yet another embodiment, test operation merely maintains a count of how many times the flow has branched back to operation 410. Once mark operation 410 has been performed a predetermined number of times, then test determination 414 causes flow to branch NO to pause operation 416. Thus, test operation 414 may simply cause the mark operation to be performed two or three times, which may mark an adequate number of objects. Of course, the predetermined number may be higher than three.

In each of these embodiments, it is presumed that the number of modifications appearing in the information received from the write watch module becomes less and less each time. In operation this is the typically the case. In essence, during the first mark phase a considerable number of modifications may occur since the marking takes a significant amount of time. However, in most cases, the second mark phase consumes much less time, compared to the first mark phase since only the modified objects are revisited. Since the second mark phase occurs relatively quickly, less time is available to the application to generate memory modifications. Thus, the number of modifications created by the application during the second mark phase is typically much less, compared to the number of modifications occurring in the first mark phase. In most cases, subsequent marking phases similarly consume less and less time.

Once test operation has determined that the precondition has been satisfied, then flow branches YES to pause operation 416, which pauses the program and any running processes. Following the pause operation 416, mark operation 418 marks the remaining objects using write watch information, which was received during the last pass through operation 412. Operation 418 is similar to operation 316 described above in conjunction with FIG. 4 in that it revisits the modified objects and then performs a mark operation using the actual stack.

Next, finish operation 420 completes the garbage collection process. Operation 420 is the same as operation 318 described above. In essence, any garbage collection technique that uses marked objects can be used at this stage of the operation. Upon finishing of the garbage collection process, restart operation 424 restarts the program.

The above described system and method provides a significant advantage over prior garbage collection techniques since the marking phase occurs substantially concurrently with the operation of the application and since the accumulation operation performed by the write watch module does not significantly pause the running of the application. The process stops or pauses the application a first time to take the snapshot of the memory layout or otherwise arrange for scanning the stack during execution, but this pause is brief since it is generally proportional to the size of the stack of roots. Such a pause is typically so brief (as compared to pauses that are proportional to all allocated memory) that the effects are hardly noticeable, if at all. Next, the application is paused a second time to mark any remaining memory allocations. Again, however, this pause is significantly shorter than prior methods which marked the entire memory. Additionally, since the write watch module simply maintains a log of information related to modified objects, no interference with the running of the application occurs. That is, no page fault exception handling occurs that might hinder the performance of the application.

The invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Although the invention has been described in language specific to structural features and/or methodological steps, it is to be understood that the invention defined in the appended claims is not necessarily limited to the specific features or steps described. As an example, other garbage collection techniques that use marking can benefit from the principles of the present invention. Therefore, the specific features and steps are disclosed as preferred forms of implementing the claimed invention.

What is claimed is:

1. A method of marking memory objects for collecting garbage in a computer system, said method comprising:
   getting root information, the root information having object references to memory objects;
   accumulating modification information, the modification information related to memory objects modified following the getting of root information;
   marking reachable memory objects using the root information; and
   following the marking operation, revisiting modified memory objects identified by the accumulated modification information, wherein the revisiting act marks the revisited memory object.

2. A method as defined in claim 1 wherein an application thread modifies the memory objects and the accumulating act is performed independently of the application thread.

3. A method as defined in claim 1 wherein the computer system further comprises a write watch module and the act of accumulating modification information is performed by the write watch module.

4. A method as defined in claim 3 wherein the computer system further comprises at least one executing application and a stack of memory information, wherein the method further comprises:

following the act of revisiting the modified memory objects, pausing an executing application; and marking at least one unvisited memory object from the stack.

5. A method as defined in claim 1 wherein prior to pausing the executing application, the revisiting and marking act is repeated until the modification information is below a predetermined threshold.

6. A method as defined in claim 1 wherein prior to the revisiting and marking act, unvisited memory objects are indicated using a first color, visited objects are indicated using a second color, and modified visited objects are indicated using a third color, wherein the modified visited objects are objects that have been modified after being visited.

7. A method of collecting garbage for an executing application in a computer system having memory and a root stack of object references, the computer system further having a plurality of allocated memory objects, the memory objects being unmarked, said method comprising the following:

pausing the executing application;

taking a snapshot of the root stack in memory;

initiating a write watch module to keep track of modifications in the memory;

restarting the application;

while the application is running, performing a first marking act of marking all reachable memory objects using snapshot information;

pausing the application;

performing a second marking act of marking all reachable memory objects identified by the write watch module;

collecting all objects left unmarked; and restarting the application.

8. A method as defined in claim 7 further comprising:

following the first act of marking reachable objects, analyzing information from the write watch module related to the changes in the memory to determine whether an intermediate marking phase should be done before pausing the application a second time;

if the analysis step determines that an intermediate marking act should be performed, performing an intermediate marking act based on information from the write watch module.

9. A method as defined in claim 8 further comprising:

if an intermediate marking act is performed, repeating the analysis act and intermediate marking act until the analysis step determines that an intermediate marking act is not necessary.

10. A method as defined in claim 8 wherein the analysis of the information from the write watch module comprises:

comparing the number of modified memory objects to a predetermined threshold value;

if the number of modified memory objects is greater than the predetermined threshold value, determining that an intermediate marking act should be performed.

11. A method as defined in claim 10 wherein the predetermined threshold value relates to a percentage of the number of allocated memory objects.

12. A method as defined in claim 7 wherein the second marking act of marking modified memory objects is repeated a predetermined number of times.

13. A method as defined in claim 7 wherein the act of collection unmarked memory objects further comprises sweeping the memory and adding references to the unmarked memory to a free list.

14. A method as defined in claim 7 wherein the memory is divided into at least two memory portions and wherein all marked and unmarked objects are located in one of the memory portions, and wherein the act of collecting unmarked memory objects further comprises copying all marked objects to another memory portion.

15. A method as defined in claim 7 wherein the act of collecting unmarked memory objects further comprises:

planning the relocation of the marked memory objects;

updating object references located within other memory objects, wherein the updated object reference related to the new locations in memory as determined by the act of planning the relocation;

compacting the memory objects to relocate the memory objects; and updating a reference pointer related to an end of the compacted memory.

16. A system for collecting garbage memory objects using a concurrent marking scheme, the system comprising:

a write watch module for accumulating information related to modified objects, wherein the write watch module maintains a bit map having at least one bit per memory object;

a root module for getting root information allowing the tracing memory objects that are live memory objects at the time of cloning the memory information;

a marking module for marking the memory objects traceable using the root information;

a revisiting module for revisiting modified memory objects using information accumulated by the write watch module; and a finishing module for collecting all unmarked memory objects, where the unmarked memory objects are garbage objects.

17. A system as defined in claim 16 further comprising a testing module for determining whether another revisiting process should be completed prior to finishing the collection of unmarked objects.

18. A computer program product readable by a computer and encoding instructions for executing a computer process for marking memory objects as part of a garbage collection session, the process comprising:

getting root information, the memory information having object references to memory objects;

accumulating modification information, the modification information related to memory objects modified following the getting of root information;

marking reachable memory objects using the root information; and following the marking operation, revisiting modified memory objects identified by the accumulated modification information, wherein the revisiting act marks the revisited memory object.

19. A computer program product as defined in claim 18 wherein the computer further comprises a write watch module and the act of accumulating modification information is performed by the write watch module.

20. A computer program product as defined in claim 19 wherein the computer further comprises at least one executing application and a stack of memory information, wherein the method further comprises:

following the act of revisiting the modified memory objects, pausing an executing application; and marking at least one unvisited memory object from the stack.

21. A computer program product as defined in claim 18 wherein prior to pausing the executing application, the revisiting and marking act is repeated until the modification information is below a predetermined threshold.

22. A computer program product as defined in claim 18 wherein prior to the revisiting and marking act, unvisited memory objects are indicated using a first color, visited objects are indicated using a second color, and modified visited objects are indicated using a third color, wherein the modified visited objects are objects that have been modified after being visited.

23. A computer program product readable by a computer system and encoding instructions for executing a computer process for marking memory objects as part of a garbage collection session, the computer system memory and a root stack of object references, the computer system further comprising a plurality of allocated memory objects, the memory objects being unmarked, said process comprising:

pausing the executing application;

taking a snapshot of the root stack in memory;

initiating a write watch module to keep track of modifications in the memory;

restarting the application;

while the application is running, performing a first marking act of marking all reachable memory objects using snapshot information;

pausing the application;

performing a second marking act of marking all reachable memory objects identified by the write watch module;

collecting all objects left unmarked; and restarting the application.

24. A computer program product as defined in claim 23 wherein the process further comprises:

following the first act of marking reachable objects, analyzing information from the write watch module related to the changes in the memory to determine whether an intermediate marking phase should be done before pausing the application a second time;

if the analysis step determines that an intermediate marking act should be performed, performing an intermediate marking act based on information from the write watch module.

25. A computer program product as defined in claim 24 wherein the process further comprises:

if an intermediate marking act is performed, repeating the analysis act and intermediate marking act until the analysis step determines that an intermediate marking act is not necessary.

26. A computer program product as defined in claim 25 wherein the process further comprises:

comparing the number of modified memory objects to a predetermined threshold value;

if the number of modified memory objects is greater than the predetermined threshold value, determining that an intermediate marking act should be performed.

27. A computer program product as defined in claim 26 wherein the predetermined threshold value relates to a percentage of the number of allocated memory objects.

28. A computer program product as defined in claim 23 wherein the second marking act of marking modified memory objects is repeated a predetermined number of times.

29. A computer program product as defined in claim 23 wherein the act of collection unmarked memory objects further comprises sweeping the memory and adding references to the unmarked memory to a free list.

30. A computer program product as defined in claim 23 wherein the memory is divided into at least two memory portions and wherein all marked and unmarked objects are located in one of the memory portions, and wherein the act of collecting unmarked memory objects further comprises copying all marked objects to another memory portion.

31. A computer program product as defined in claim 23 wherein the act of collecting unmarked memory objects further comprises:

planning the relocation of the marked memory objects;

updating object references located within other memory objects, wherein the updated object reference related to the new locations in memory as determined by the act of planning the relocation;

compacting the memory objects to relocate the memory objects; and updating a reference pointer related to an end of the compacted memory.

* * * * *

UNITED STATES PATENT AND TRADEMARK OFFICE
CERTIFICATE OF CORRECTION

PATENT NO. : 6,502,111 B1 Page 1 of 1
DATED : December 31, 2002
INVENTOR(S) : Dussud It is certified that error appears in the above-identified patent and that said Letters Patent is hereby corrected as shown below:

Column 11,
Line 36, delete "sty" and replace with -- step --.

Signed and Sealed this

Second Day of December, 2003

JAMES E. ROGAN
*Director of the United States Patent and Trademark Office*